(12) United States Patent
Mueller et al.

(10) Patent No.: US 8,832,470 B2
(45) Date of Patent: Sep. 9, 2014

(54) POWERING UNIVERSAL SERIAL BUS SYSTEMS

(75) Inventors: Brian K. Mueller, Fort Collins, CO (US); Ricky F. Bitting, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 534 days.

(21) Appl. No.: 13/216,392

(22) Filed: Aug. 24, 2011

(65) Prior Publication Data

US 2013/0049838 A1  Feb. 28, 2013

(51) Int. Cl.
*G06F 1/00* (2006.01)
*G06F 1/26* (2006.01)
*G05F 1/56* (2006.01)

(52) U.S. Cl.
CPC . *G06F 1/266* (2013.01); *G05F 1/56* (2013.01)
USPC .......................................... 713/300; 710/313

(58) Field of Classification Search
USPC .......................................... 713/300; 710/313
See application file for complete search history.

(56) References Cited

U.S. PATENT DOCUMENTS

| 7,830,039 | B2 * | 11/2010 | Nguyen et al. | 307/65 |
| 7,898,091 | B2 * | 3/2011 | Sprouse et al. | 257/777 |
| 2006/0184987 | A1 * | 8/2006 | Allen et al. | 725/100 |

* cited by examiner

*Primary Examiner* — Jaweed A Abbaszadeh

(57) ABSTRACT

Described embodiments provide for a regulated voltage supply to a Universal Serial Bus (USB) system. The regulator comprises a pass device that might be coupled to a host device providing a bus voltage. An integrated USB physical layer (PHY) is coupled to the pass device through a control voltage signal pin. A regulation circuit is coupled to the integrated USB PHY, and the regulation circuit supplies about 3.3V from the bus voltage.

15 Claims, 2 Drawing Sheets

200

POWERING UNIVERSAL SERIAL BUS SYSTEMS

CROSS-REFERENCE TO RELATED APPLICATIONS

The subject matter of this application is related to U.S. patent application Ser. No. 12/884,460 filed on Sep. 17, 2010, the teachings of which are incorporated herein in their entireties by reference.

BACKGROUND OF THE INVENTION

1. Field of the Invention

The present invention relates to universal serial bus systems, and, in particular, to powering universal serial bus systems.

2. Description of the Related Art

Computers and other devices commonly use Universal Serial Bus (USB) communication ports for serial data transfers. A USB system generally consists of one or more host devices and one or more peripheral devices connected in a tiered-star topology. Host devices include, for example, computers, smartphones, and video game consoles. Peripheral devices include, for example, flash drives, printers, keyboards, smartphones, and various other types of transceivers. USB standards are defined in a series of specifications. USB 2.0 Specifications, Revision 2.0, hereinafter "USB 2.0", describes a common serial data transfer interface used in a wide variety of applications. USB 3.0 Specifications, Revision 1.0, hereinafter "USB 3.0", describes a more recent interface that builds from USB 2.0 and requires backward capability to interface with USB 2.0.

USB interfaces commonly supply electric power to peripheral devices, and, therefore, many devices connected to a USB interface generally do not need a power source of their own. A USB 2.0 interface provides 5 volts (V) to connected devices through a pin in its connecting cable. A USB 2.0 connecting cable typically is comprised of a power line, a ground line, and two data differential lines. A USB 3.0 connecting cable accommodates the USB 2.0 lines, and has two additional data differential lines. Systems that require a bus-powered application might use 5V from the USB 2.0 cable's pin that is connected to the power line. Other USB peripheral devices, commonly referred to as self-powered devices, include their own on-board power supply and, therefore, do not make use of the 5V bus for operating power. USB 2.0 also requires a 3.3V signal swing for full-speed signaling at the physical layer (PHY) of an upstream (e.g., peripheral) device. Therefore, an integrated USB 2.0 system that is compatible with both USB 2.0 and USB 3.0 standards has access to a 3.3V supply.

Existing approaches to an integrated USB 2.0 PHY solution often come at a high cost, such as by requiring an external 3.3V source supplied to the PHY layer circuits. Other approaches are generally unable to efficiently integrate USB 2.0 PHY with USB 3.0 PHY because the USB 2.0 PHY layer employs circuitry having 2.5V Input/Output (I/O) devices, which generally increases power consumption. USB 2.0 PHY also requires additional circuitry to detect bus voltage in integrated solutions.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide for a regulation apparatus to supply about 3.3 volts (V) to a Universal Serial Bus (USB) system. The regulation apparatus comprises a pass device that might be coupled to a host device providing a bus voltage. An integrated USB physical layer (PHY) is coupled to the pass device through a control voltage signal pin. A regulation circuit is coupled to the integrated USB PHY, and the regulation circuit supplies about 3.3V from the bus voltage. The regulation circuit is comprised of 1.8V input/output (I/O) devices. The regulation apparatus generates a core level signal when there is a valid bus voltage, for example, connected to the control voltage pin.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention a regulation system supplies about 3.3 volts (V) to a Universal Serial Bus (USB) system. The regulation system comprises a pass device that might be coupled to a host device providing a bus voltage. An integrated USB physical layer (PHY) is coupled to the pass device through a control voltage signal pin. A regulation circuit is coupled to the integrated USB PHY, and the regulation circuit supplies about 3.3V from the bus voltage. The regulation system generates a core level signal when there is a valid bus voltage, for example, using a control voltage pin instead of a bus voltage pin. The regulation system might integrate a USB 2.0 PHY without requiring an external 3.3V source. Additionally, the regulation system allows all circuitry to be implemented with 1.8V I/O constraints, decreasing power consumption and lowering implementation cost. The low-cost integrated USB 2.0 PHY might also handle a direct bus voltage connection, thus eliminating additional bus voltage detection circuitry.

Figure 1:
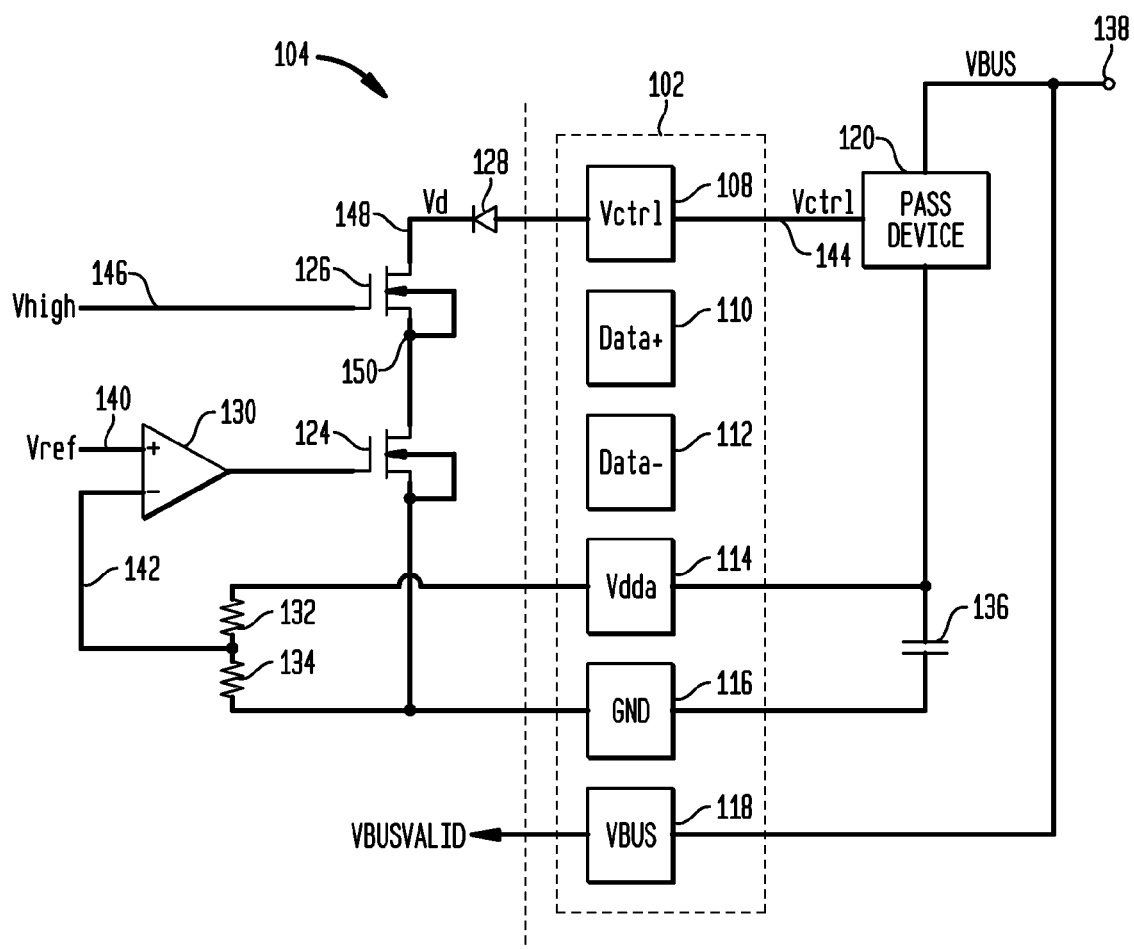
FIG. 1 shows a regulation system operating in accordance with a first exemplary embodiment of the present invention.

FIG. 1 shows regulation system 100 operating in accordance with a first exemplary embodiment of the present invention. Regulation system 100 includes integrated Universal Serial Bus (USB) physical layer (PHY) 102 having signal pins 108-118. Signal pins 110, 112, 116 and 118, for example, might be coupled to a USB 2.0 connecting cable to connect regulation system 100 to a USB host device. The USB 2.0 connecting cable includes data differential lines that might tie directly into Data+pin 110 and Data-pin 112. In some embodiments, the USB 2.0 cable's ground pin might tie directly to a quiet system ground that is shared with integrated USB 2.0 PHY 102 ground pin 116. The USB 2.0 cable's bus voltage pin might be employed by a peripheral device as primary power, such as in a bus-powered system. Embodiments of the present invention might utilize control voltage pin 108 to generate approximately 3.3 volts (V), as described subsequently herein. Regulation system 100 also includes pass device 120 and regulation circuitry 104. Some embodiments might implement pass device 120 at a board level, while implementing regulation circuitry 104 and integrated USB 2.0 PHY 102 as a system on chip (SoC).

Bus voltage 138 (VBUS in FIG. 1) might be supplied from a host device through the power line of a USB cable, and used as a power source to generate an approximately 3.3V signal employed by integrated USB 2.0 PHY 102. Some embodiments generate this 3.3V signal utilizing pass device 120 which is controlled, through control voltage pin 108, by regulation circuitry 104. As shown in FIG. 1, pass device 120 is implemented with a PNP bipolar junction transistor (BJT) that has its emitter coupled to bus voltage 138, its base coupled to control voltage pin 108, and its collector coupled to 3.3V supply pin 114. The collector of pass device 120 is also coupled to capacitor 136 coupled to ground pin 116. In other embodiments, pass device 120 is implemented with a positive-channel field effect transistor (PFET) that has its source coupled to bus voltage 138, its gate coupled to control voltage pin 108, and its drain coupled to 3.3V supply pin 114. The drain is also coupled to capacitor 136 coupled to ground pin 116.

Regulation circuitry 104 might also accommodate voltage limits constrained by the use of 1.8V input/output (I/O) devices. For example, regulation circuitry 104 employs amplifier 130 to drive the gate of negative-channel FET (NFET) 124. Amplifier 130 has a positive input that is set by stable voltage reference 140 (Vref in FIG. 1). Amplifier 130 has negative input 142 that is a voltage divided version of the regulated voltage supply from 3.3V supply pin 114. The voltage division of the regulated voltage supply from 3.3V supply pin 114 occurs through series-connected resistors 132 and 134 across the voltage of capacitor 136. Amplifier 130 negative input 142 is coupled to the node between series-connected resistors 132 and 134, and the voltage division selected through appropriate selection of resistance values for resistors 132 and 134. In embodiments in which 1.8V I/O devices are not used in regulation circuitry 104, control voltage pin 108 might tie directly to the drain of NFET 124 to close the regulation loop. In other embodiments, the voltage range on the drain of NFET 124 (node 150 in FIG. 1) is desirably less than about 2V, for example, to ensure safe reliability.

The circuitry of FIG. 1 illustrates how reliability might be maintained to accommodate 1.8V I/O devices. For example, the voltage range applied to control voltage pin 108 is set by the range of bus voltage 138, which reaches to about 5.25V in USB specifications. Pass device 120 drops the voltage from bus voltage 138 to control voltage 144 (Vctrl in FIG. 1). If pass device 120 is implemented with a PFET, for example, the threshold voltage of the PFET drops the voltage from bus voltage 138 to control voltage 144. If pass device 120 is implemented with a PNP BJT, the base-emitter voltage drops the voltage from bus voltage 138 to control voltage 144. For example, a base-emitter voltage of about 0.7V might limit the drain of NFET 124 at node 150 to about 4.5V if no other circuitry is coupled between NFET 124 and control voltage 144. NFET 126, for example, might be used as a cascode device to provide an additional voltage limitation to the drain of NFET 124 at node 150, thus stabilizing the voltage at node 150. The gate voltage of NFET 126 might limit the drain voltage of NFET 124 at node 150. High supply voltage 146 (Vhigh in FIG. 1), such as the I/O supply voltage, might be used as the gate voltage of NFET 126. In embodiments in which NFET 126 is a 1.8V device, its drain/source voltage is limited to about 2V or less. Diode 128 might be employed to provide additional voltage drop to the drain of NFET 126. Without diode 128, drain voltage 148 (Vd in FIG. 1) might be approximately 4.5V (or equal to control voltage 144).

If, for example, bus voltage 138 is approximately 4.4V, which is also approximately the lowest valid USB bus level voltage, control voltage 144 is approximately 3.7V. Here, drain voltage 148 is about 3.0V which allows, for example, sufficient drain-source voltage of NFET 124 and NFET 126 so that both devices operate within a reliable range. For example, regulation circuitry 104 might regulate from control voltage 144 (a function of VBUS) to approximately 3.3V (voltage at 3.3V supply pin 114) without degradation of reliable operation.

In some embodiments of the present invention, the USB 2.0 connecting cable's bus voltage pin is also coupled to bus voltage pin 118 of integrated USB 2.0 PHY 102, allowing for, for example, integrated USB 2.0 PHY 102 to generate a core level signal to indicate a valid bus voltage (signal VBUSVALID in FIG. 1) without external circuitry.

Figure 2:
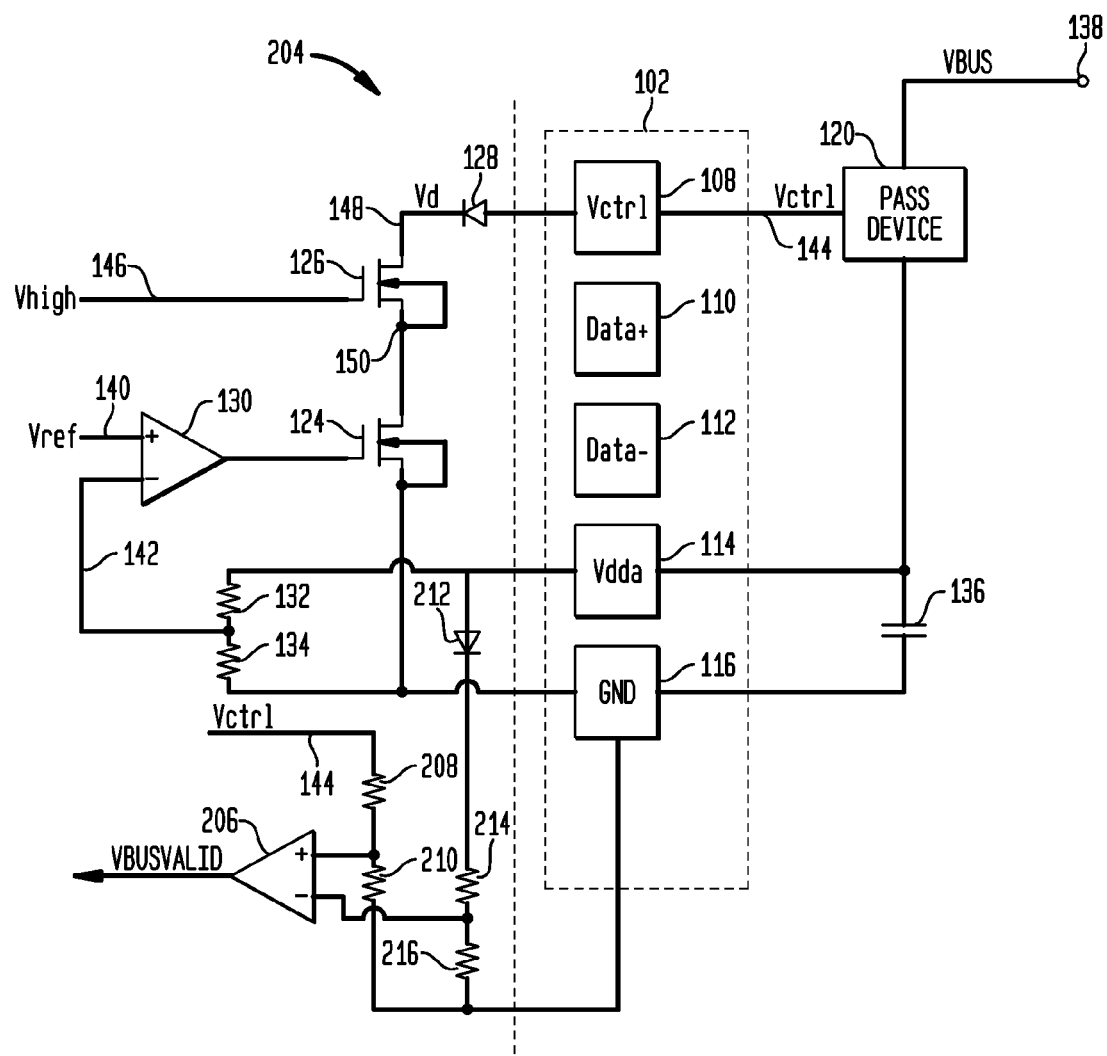
FIG. 2 shows a comparator regulation system operating in accordance with a second exemplary embodiment of the present invention.

FIG. 2 shows comparator regulation system 200 operating in accordance with a second exemplary embodiment of the present invention. Comparator regulation system 200 is a similar, but modified, configuration to that of FIG. 1, and so like-numbered elements of FIGS. 1 and 2 operate in an analogous manner. In comparator regulation system 200, regulation circuitry 204 utilizes comparator 206 to detect a valid level of bus voltage 138 without bus voltage pin 118 of integrated USB 2.0 PHY 102. Control voltage 144 is referenced with a voltage divider (resistor 208 and resistor 210 in FIG. 2) to the positive input of comparator 206. Control voltage 144 is referenced, for example, by a direct voltage relationship to bus voltage 138 through pass device 120. The negative input of comparator 206 is a voltage divided version of the voltage at 3.3V supply pin 114. The voltage at 3.3V supply pin 114 is divided at the center node of series-coupled resistor 214 and resistor 216. The voltage at 3.3V supply pin 114 is employed, for example, as a stable voltage reference across temperature ranges. Diode 212 might also be coupled to 3.3V supply pin 114 and resistor 214 to minimize or cancel effects of temperature variations of pass device 120. For example, if pass device 120 is a PNP transistor, control voltage 144 might vary with temperature, and diode 212 might cancel out the variances of the PNP diode. In embodiments in which pass device 120 is a pass device structure that does not have temperature variation, such as a PFET, diode 212 might not be in the path from 3.3V supply pin 114 to the negative input of comparator 206. Regulation circuitry 204, using comparator 206, generates a core level detection signal (VBUSVALID in FIG. 2) when a valid bus voltage is detected.

A regulation system in accordance with exemplary embodiments of the present invention provides for the following advantages. The regulation system integrates a USB 2.0 PHY without requiring an external 3.3V source. A 3.3V power source is generated with internal regulation circuitry and a low-cost pass device. Additionally, the regulation system allows all circuitry to be implemented with 1.8V I/O constraints, decreasing power consumption and lowering implementation cost. The low-cost integrated USB 2.0 PHY might also handle a direct bus voltage connection, thus eliminating additional bus voltage detection circuitry.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing in hardware, including possible implementation as a single integrated circuit, a multi-chip module, a single card, or a multi-card circuit pack, the present invention is not so limited. As would be apparent to one skilled in the art, various functions of hardware may also be implemented in a software program. Such software may be implemented as steps performed by, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here. It will be further understood that various changes in the details, materials, and arrangements of the parts which have been described and illustrated in order to explain the nature of this invention may be made by those skilled in the art without departing from the scope of the invention as expressed in the following claims.

We claim:

1. A regulation apparatus, comprising:
a pass device adapted to receive a bus voltage from a host device;
an integrated USB physical layer (PHY) coupled to the pass device through a control voltage signal pin; and
a regulation circuit coupled to the integrated USB PHY and adapted to supply substantially 3.3 volts (V) from the bus voltage.

2. The regulation apparatus of claim 1, wherein the regulation circuit is comprised 1.8V input/output (I/O) devices.

3. The regulation apparatus of claim 1, wherein the regulation circuit and the integrated USB PHY are co-located on a system on chip (SoC).

4. The regulation apparatus of claim 1, wherein the integrated USB PHY is coupled to the host device through a bus voltage pin adapted to generate a core level signal indicating a valid bus voltage from the host device.

5. The regulation apparatus of claim 1, further comprising:
a comparator configured to generate a core level signal indicating a valid bus voltage from the host device, wherein the comparator is coupled to the control voltage pin.

6. The regulation apparatus of claim 1, wherein the pass device is a PNP bipolar junction transistor having a base coupled to the control voltage pin and an emitter coupled to the bus voltage.

7. The regulation apparatus of claim 1, wherein the pass device is a positive-channel field effect transistor having a gate coupled to the control voltage pin and a source coupled to the bus voltage.

8. The regulation apparatus of claim 1, wherein the integrated USB PHY further comprises:
one or more signal pins configured to connect to a USB connecting cable.

9. The regulation apparatus of claim 5, wherein the comparator further comprises:
a positive input having a voltage divider coupled to the control voltage pin; and
a negative input having a second voltage divider coupled to a supply voltage pin.

10. A method of generating power for a Universal Serial Bus (USB) system, the method comprising:
receiving, by a pass device, a bus voltage from a host;
supplying, by a regulation circuit coupled to the pass device through an integrated USB physical layer (PHY), substantially 3.3 volts (V) from the bus voltage, the regulation circuit comprising 1.8V input/output (I/O) devices.

11. The method of claim 10, further comprising:
generating, by a comparator, a core level signal indicating a valid bus voltage from a host device.

12. A method of regulating a voltage from a pass device, comprising:
providing, to an integrated USB PHY, a control voltage from a bus voltage by a pass device;
dropping the control voltage from the integrated USB PHY with a diode; and
regulating, with a regulation circuit, the dropped control voltage by:
stabilizing, with a cascade device, a node voltage to less than substantially 2 volts; and dividing, based on the node voltage, a supply voltage to the integrated USB PHY, thereby supplying, a regulated voltage of substantially 3.3 volts to the integrated USB PHY.

13. The method of claim 12, further comprising:
generating, by a comparator, a core level signal indicating a valid bus voltage from a host device.

14. The method of claim 12, wherein the generating the core level Signal further comprises:
dividing the control voltage;
providing the divided control voltage to a positive input of the comparator; and
providing the divided supply voltage to a negative input of the comparator.

15. The method of claim 12, further comprising:
dropping the supply voltage by a second diode, thereby minimizing effects on the pass device from temperature variations.

* * * * *